(12) United States Patent
Misu et al.

(10) Patent No.: US 7,547,466 B2
(45) Date of Patent: Jun. 16, 2009

(54) METHOD OF MANUFACTURING SPINDLE MOTOR

(75) Inventors: Isao Misu, Kyoto (JP); Yuya Tamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 910 days.

(21) Appl. No.: 10/708,760

(22) Filed: Mar. 24, 2004

(65) Prior Publication Data

US 2004/0187955 A1 Sep. 30, 2004

(30) Foreign Application Priority Data

Mar. 24, 2003 (JP) .............................. 2003-080405

(51) Int. Cl.
B05D 3/00 (2006.01)
B05D 7/24 (2006.01)
B05C 3/00 (2006.01)

(52) U.S. Cl. .................. 427/350; 427/230; 427/231; 427/323; 384/93; 384/625; 184/6.21; 141/115; 141/121; 141/126; 118/320; 118/416

(58) Field of Classification Search .............. 141/8, 141/115, 126, 121, 250, 251, 261, 266; 384/91, 384/93, 625, 627; 184/6.21; 118/319, 320, 118/321, 409, 416; 427/350, 155, 296, 256, 427/154, 156, 352, 240, 241, 323, 235, 424, 427/425, 435, 436

See application file for complete search history.

(56) References Cited

U.S. PATENT DOCUMENTS 4,050,078 A * 9/1977 Isayama et al. ................ 347/7
6,056,822 A * 5/2000 Jefferson et al. ............ 118/683
6,395,331 B1 5/2002 Yan et al.
2001/0025890 A1 * 10/2001 Fujimoto et al. ............... 239/1

FOREIGN PATENT DOCUMENTS

| JP | H08-140304 A | 5/1996 |
| JP | 2000-266052 A | 9/2000 |
| JP | 2001-059082 A | 3/2001 |
| JP | 2001-232289 A | 8/2001 |
| JP | 2001232289 A * | 8/2001 |
| JP | 2001-248645 * | 9/2001 |
| JP | 2001-304263 A | 10/2001 |
| JP | 2002-295490 A | 10/2002 |
| JP | 2003-065336 A | 3/2003 |
| WO | WO-98/40323 | 9/1998 |

* cited by examiner

Primary Examiner—Michael Kornakov
Assistant Examiner—Francis P Smith
(74) Attorney, Agent, or Firm—Volentine & Whitt, PLLC

(57) ABSTRACT

One aspect of the present invention relates to a spindle motor manufacturing method for forming an oil repellent film which prevents a lubricating oil from flowing out, on a predetermined area adjacent to a hydrodynamic bearing, the predetermined area being located on at least one of a stationary member and a rotating member. The spindle motor manufacturing method mentioned above comprises a step of supplying an oil repellent solution by a supplying portion onto a part of the predetermined area for forming the oil repellent film, a step of applying an air current to the part of the predetermined area on which the oil repellent solution is supplied so as to peel off an excess part of the oil repellent solution supplied onto the part of the predetermined area, and a step of making a relative movement of the predetermined area in which the oil repellent film is formed, the relative movement being made with respect to the supplying portion by which the oil repellent solution is supplied.

22 Claims, 14 Drawing Sheets

METHOD OF MANUFACTURING SPINDLE MOTOR

BACKGROUND OF INVENTION

1. Field of the Invention

The present invention relates to a method of manufacturing a spindle motor in which an oil repellent film is formed by applying an oil repellent solution to a predetermined area of a rotating member and/or a stationary member constituting the spindle motor.

2. Description of the Prior Art

In recent years, in the spindle motor which is used for driving a recording medium such as a hard disc or the like, a hydrodynamic bearing utilizing a lubricating oil begins to be employed. The hydrodynamic bearing is provided, for example, with a hollow cylindrical sleeve having a bearing hole, a shaft fitted and inserted to the bearing hole at a micro gap in radial direction, and a lubricating oil filling the micro gap, and the sleeve and the shaft are supported so as to relatively rotate freely.

In this hydrodynamic bearing, there is a risk that the lubricating oil leaks out to an external portion of the hydrodynamic bearing along surfaces of the shaft and the sleeve. Accordingly, in order to prevent the lubricating oil from leaking out to the external portion of the hydrodynamic bearing, an oil repellent solution is applied to the surface of the shaft and/or the sleeve positioned near the hydrodynamic bearing, and an oil repellent film is formed thereon.

As an apparatus for coating the oil repellent solution, for example, the following oil repellent coating apparatus is disclosed in Japanese Patent Application Laid-open Publication No. 2001-232289. In other words, a deformed inner diameter portion in which an inner diameter is non-linearly changed in axial direction is formed in an inner peripheral portion of an annular bearing member. The oil repellent coating apparatus is provided with a coating head having a columnar projection portion including an opening portion in radial direction and fitted to the deformed inner diameter portion of the bearing member at a predetermined gap, and a seat portion with which a lower end surface of the bearing member is brought into contact, and automatically and evenly applies the oil repellent solution to the deformed inner diameter portion of the bearing member.

In this case, a recording medium driving apparatus using the spindle motor or another apparatus is promoted in a downsizing and a thin structure, and the spindle motor used in the apparatus is also promoted in a downsizing and a thin structure. Accordingly, an area in the spindle motor in which the oil repellent film should be formed for preventing the lubricating oil from leaking out is going to be further narrowed.

In particular, since the oil repellent solution is applied to a part of the predetermined area on the surface of the shaft and/or the sleeve, and is thereafter going to spread along the surface, the oil repellent solution runs over the predetermined area and the oil repellent film tends to be formed.

In the oil repellent coating apparatus described in Japanese Patent Application Laid-open Publication No. 2001-232289 mentioned above, it is possible to automatically apply the oil repellent solution to the deformed inner diameter portion in which the inner diameter is non-linearly changed. However, in the deformed inner diameter portion, it is impossible to control the area in which the oil repellent solution spreads so as to accurately form the oil repellent film in the predetermined area.

SUMMARY OF INVENTION

An object of the present invention is to accurately form an oil repellent film on a predetermined area of a member constituting a spindle motor by controlling the area in which an oil repellent solution spreads.

Further, another object of the present invention is to provide a spindle motor manufacturing method which can manufacture the spindle motor in which the oil repellent film is accurately formed.

A spindle motor in accordance with one aspect of the present invention has a stationary member, a rotating member and a hydrodynamic bearing, the hydrodynamic bearing having a gap formed between said stationary member and said rotating member and having a lubricating oil retained in the gap for supporting said rotating member with respect to said stationary member in a rotatable manner. Further, the one aspect of the present invention relates to a spindle motor manufacturing method of forming an oil repellent film for preventing the lubricating oil from flowing out, in a predetermined area adjacent to the hydrodynamic bearing, the predetermined area being located on at least one of the stationary member and the rotating member.

The spindle motor manufacturing method mentioned above comprises a step of supplying an oil repellent solution by a supplying portion onto a part of the predetermined area for forming the oil repellent film, a step of applying an air current to the part of the predetermined area on which the oil repellent solution is supplied so as to peel off an excess part of the oil repellent solution supplied onto the part of the predetermined area, and a step of making a relative movement of the predetermined area in which the oil repellent film is formed, the relative movement being made with respect to the supplying portion by which the oil repellent solution is supplied.

In accordance with the method mentioned above, it is possible to control the spread of the oil repellent solution in the predetermined area on which the oil repellent film is formed, and it is possible to remove a supplied excess oil repellent solution.

In this case, the peeling step can employ a method of suctioning and thereby removing the supplied excess oil repellent solution, or a method of blowing and thereby removing the supplied excess oil repellent solution.

Another manufacturing method of a spindle motor comprises a step of supplying an oil repellent solution by a supplying portion onto a part of the predetermined area for forming the oil repellent film, a step of applying an air current onto the part of the predetermined area on which the oil repellent solution is supplied so as to peel off an excess part of the oil repellent solution supplied to the part of the predetermined area, a step of making a relative movement of the predetermined area in which the oil repellent film is formed, and the relative movement is made with respect to the supplying portion, a step of supplying a solvent for dissolving the excess part of said oil repellent solution, peeled off in said applying air current step; and a step of removing said oil repellent solution dissolved by the solvent.

In the case of using a volatile oil repellent solution, the oil repellent solution tends to be solidified for a short time. In accordance with the another method of the present invention, the solvent is added to the peeled oil repellent solution by supplying the solvent in which the oil repellent dissolves.

Accordingly, it is possible to prevent the peeled oil repellent solution from being solidified, and it is possible to smoothly recover the peeled oil repellent solution.

DETAILED DESCRIPTION

A description will be given below of a method of manufacturing spindle motor in accordance with respective embodiments of the present invention with reference to FIGS. 1 to 14.

Figure 1:
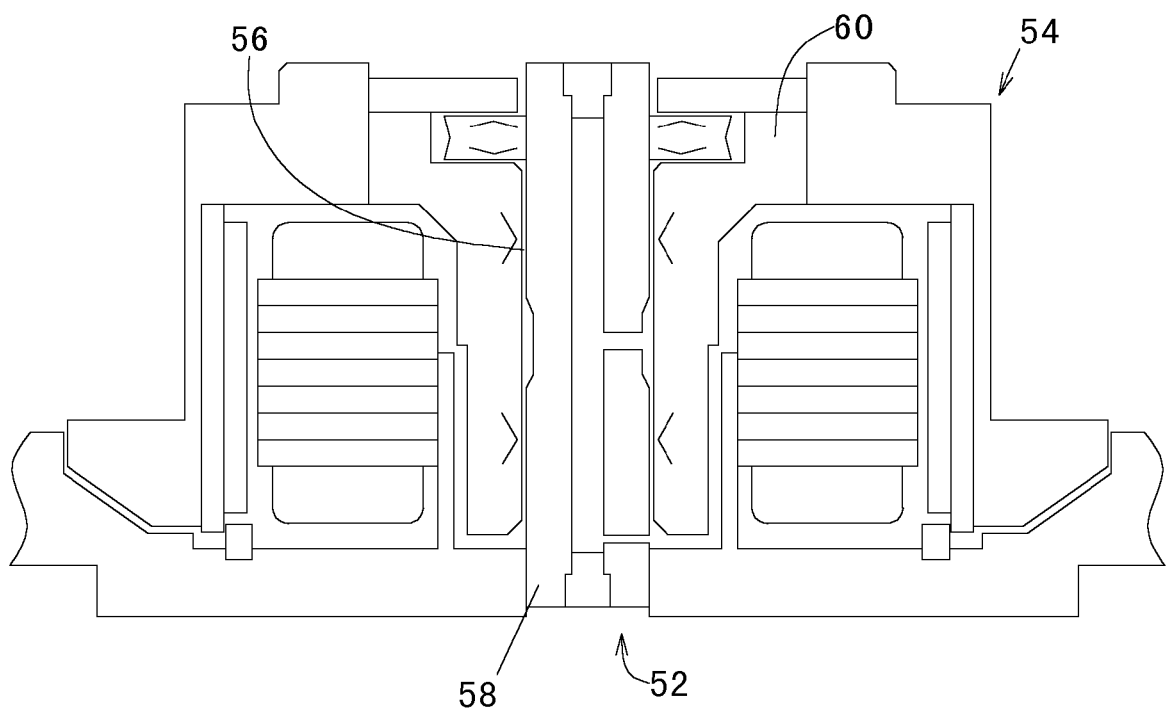
FIG. 1 is a cross-sectional view showing a spindle motor which can be manufactured using in part a method in accordance with the present invention.
Figures 2A, 2B:
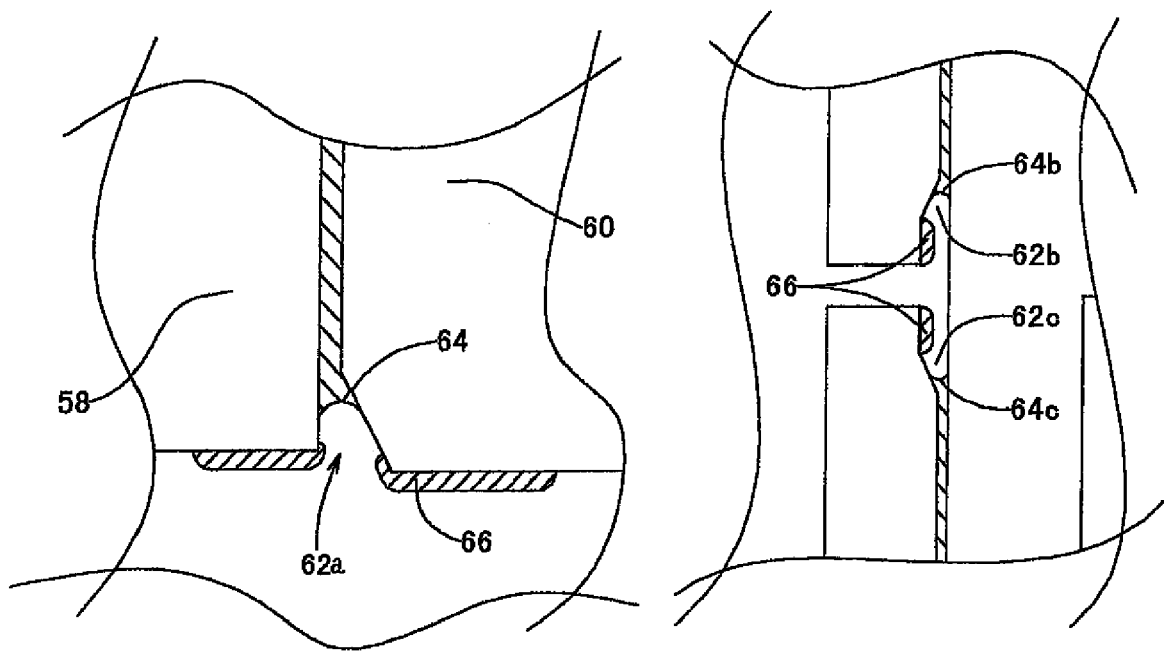
FIG. 2a and FIG. 2b are each an enlarged cross-sectional view of a respective part of the spindle motor in FIG. 1.

FIG. 1 shows an example of a spindle motor to which the present invention may be applied. FIGS. 2a and 2b are each an enlarged cross-sectional view of a respective portion of the spindle motor shown in FIG. 1.

A spindle motor is provided with a stationary member 52, a rotating member 54 and a hydrodynamic bearing 56. The rotating member 54 is rotatably supported by the hydrodynamic bearing 56 structured between the rotating member 54 and the stationary member 52. The hydrodynamic bearing 56 is constituted by an outer peripheral surface of an approximately cylindrical shaft 58 of the stationary member 52, an inner peripheral surface of a hollow cylindrical sleeve 60 of the rotating member 54, and a lubricating oil filled between the outer peripheral surface of the shaft 58 and the inner peripheral surface of the sleeve 60. As shown in FIG. 2(a), an inclined surface in which an inner diameter of the sleeve 60 is reduced from a lower end surface is provided in a lower inner peripheral surface of the sleeve 60. Further, a taper seal portion 62a in which a gap size is expanded toward a lower side in a direction of a rotational axis is formed in a gap between the inclined surface of the sleeve 60 and an outer peripheral surface of the shaft 58 opposing to the inclined surface in radial direction. Further, as shown in FIG. 2(b), an inclined surface in which a diameter of an outer shape of the shaft 58 is reduced from an outer peripheral surface is provided in an approximately center portion of the outer peripheral surface of the shaft 58. Further, taper seal portions 62b and 62c in which gap sizes are expanded toward an inner side in rotational axis direction are formed in a gap between the inclined surface of the shaft 58 and an inner peripheral surface of the sleeve 60 opposing to the inclined surface in radial direction. A lubricating oil is retained in the taper seal portions 62a, 62b and 62c, a surface tension of the lubricating oil and an ambient air pressure are balanced in the taper seal portions 62a, 62b and 62c, and interfaces 64a, 64b and 64c between the lubricating oil and the air are formed in a meniscus shape.

The interface of the lubricating oil is retained by the surface tension in macroscopic phenomenon, however, the oil is diffused along the surfaces of the shaft 58 and the sleeve 60 in macroscopic phenomenon so as to tend to ooze the oil to an outer side of the hydrodynamic bearing 56. In order to prevent this phenomenon, oil repellent films 66 are formed on surfaces of the shaft and/or the sleeve near and/or adjacent to areas of the interfaces 64a, 64b and 64c of the lubricating oil. Since the oil repellent films 66 are provided on the surfaces thereof with a nature of keeping a molecule of the lubricating oil surface off, it is possible to prevent the lubricating oil from oozing and leaking out of the bearing.

Each oil repellent film 66 is formed by applying an oil repellent solution to the predetermined area on the surfaces of the shaft 58 and/or the sleeve 60, and thereafter removing a solvent by means of an oven heating or the like.

The oil repellent solution is obtained by dissolving an oil repellent to the solvent. It is preferable that a polytetrafluoroethylene (PTFE), a polyfluorovinylidene (PVDF), a polyfluorovinyl (PVF), an ethylene-tetrafluoroethylene copolymer (ETFE), an ethylene-chlorotrifluoroethylen copolymer (ECTFE), or a fluorocarbon resin such as a resin in which a part of molecular structure thereof is substituted by a functional group is employed as the oil repellent. In particular, a perfluoro resin is preferable in view of low surface energy and a high oil repellent performance. In the case that the fluorocarbon resin is employed as the oil repellent, it is preferable that the medium used as the solvent employs a fluorine compound group medium. The medium used as the solvent generally has a volatile property.

Figure 3:
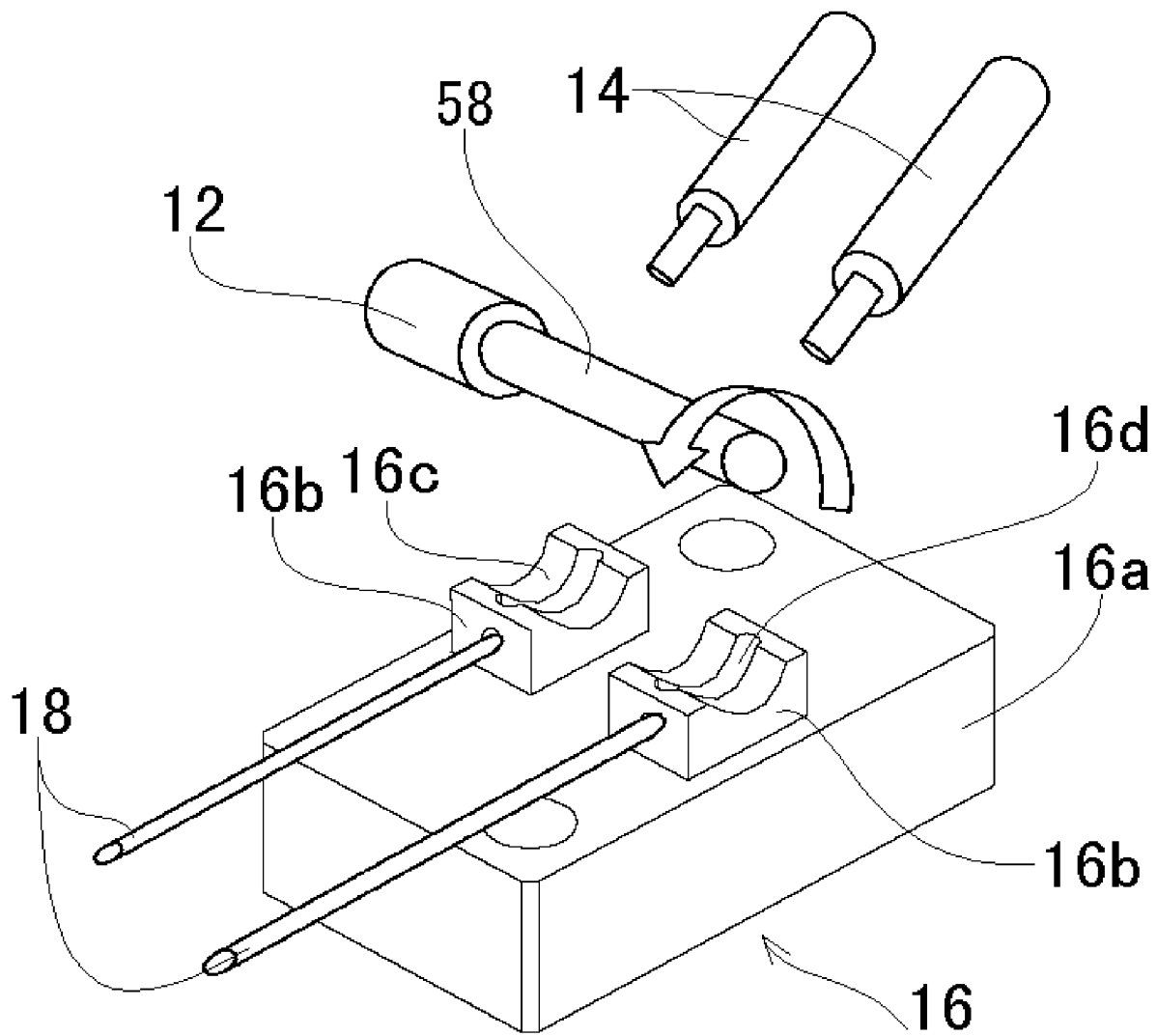
FIG. 3 is a perspective view showing a coating step of an oil repellent solution in accordance with a first embodiment of the present invention.

Next, a description will be given of an apparatus for supplying the oil repellent solution. The apparatus in FIG. 3 is provided with a holding device 12 for a part such as a shaft onto which the oil repellent solution is applied, a pair of oil repellent solution supplying nozzles 14, a suction apparatus 16 for executing a depressurizing suction for peeling and sucking an excess oil repellent solution in the oil repellent solution applied to the part, and a pair of solvent supplying pipes 18 for supplying the solvent of the oil repellent.

The description given below is of an example in which the oil repellent solution is applied to the shaft of the hydrodynamic bearing. In this case, for convenience of description, positional relationships between the parts of the coating apparatus are described with respect to the rotational axis of the shaft. The part holding device 12 holds a lower end portion or an upper end portion of the shaft 58 corresponding to the oil repellent solution coated part, is driven by a rotation driving apparatus (not shown), and rotates the held shaft 58 in one direction. In this example, the part holding device 12 drives the part in a counterclockwise direction as shown in FIG. 3. In this case, the amount of clockwise rotation may be set by taking an amount of application of the oil repellent solution and a solidifying time into consideration. The oil repellent solution is applied to two areas apart from each other at a fixed distance in the direction of the rotational axis, on the outer peripheral surface of the shaft 58. In this case, the area to which the oil repellent solution is applied is not limited to two areas, and may be set to one area or three areas. Further, the area in the shaft 58 to which the oil repellent solution is applied is not limited to the outer peripheral surface of the shaft 58, but may be the upper end surface or the lower end surface of the shaft 58. Further, it is not always necessary to rotate the shaft 58, however, in the case of not rotating, it is necessary that the oil repellent solution supplying area and the coated area on the part are relatively displaced by the other means.

A pair of oil repellent solution supplying nozzles 14 are driven vertically, and leading end portions of the respective supplying nozzles 14 are arranged just above a part of a predetermined area around the outer peripheral surface of the shaft 58 held by the part holding device 12 respectively at a slight gap. Each of the supplying nozzles 14 applies the oil repellent solution delivered from a delivery apparatus (not shown) onto the part of the predetermined area on the outer peripheral surface of the shaft 58 in this state. In this case, it is preferable that the supplying nozzle 14 applies the oil repellent solution onto the part of the predetermined area on the outer peripheral surface of the shaft 58 from an upper side. This is because of applying the oil repellent solution discharged from the supplying nozzle 14 accurately to the part of the predetermined area of the shaft 58 on the basis of an operation of the gravity. However, the structure is not limited to this.

Figure 9:
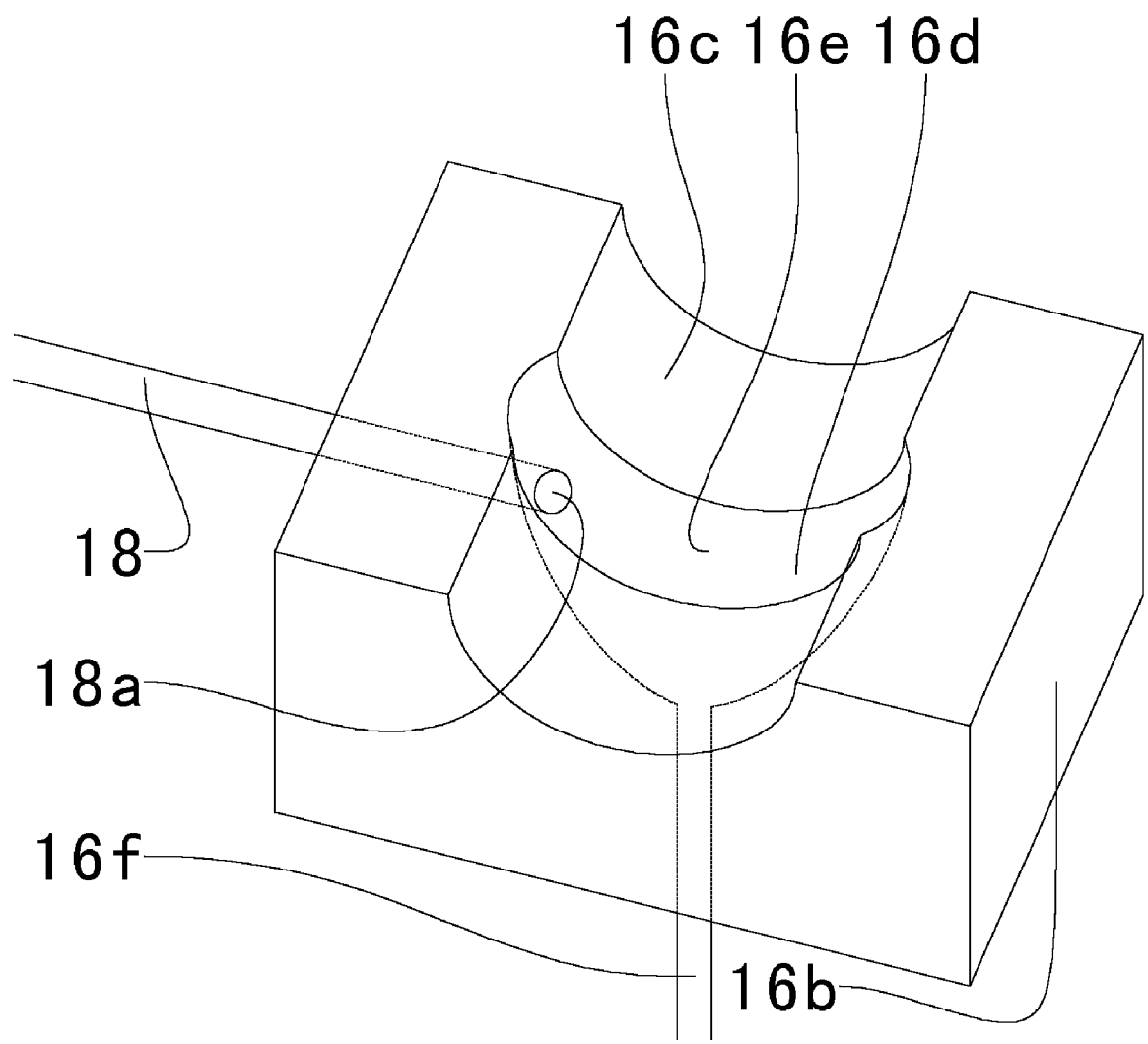
FIG. 9 is a perspective view of a main portion with respect to a suction apparatus and a supply apparatus.

A suction port 16*d* is formed in a center portion with respect to the rotational axis direction, on the curved surface of each of the recess portions 16*c*. In an opening portion 16*e* (refer to FIG. 9) of the suction port 16*d*, a width in rotational axis direction of the opening portion 16e is approximately equal to a width in rotational axis direction of the predetermined area of the outer peripheral surface of the shaft 58 to which the oil repellent solution is applied. Further, the opening portion 16*e* is formed on the recess portion 16*c* at a center area of the width in rotational axis direction of the rectangular protruding portion 16*b*. As shown in FIG. 9, the suction port 16*d* has a depth from the opening 16*e* to the lower side (that is down ward side, the direction toward a suction tube 16*f* as shown in FIG. 9), and a downward side of the suction port 16*d* is inclined in an approximately funnel shape from the opening 16*e* to a bottom portion downward, that is a center portion. Further, an upper end of the suction tube 16*f* extending to a lower side is open to the center portion. The suction tube 16*f* communicates with an exhaust apparatus such as an exhaust pump (not shown) or the like.

A suction port 16*d* is formed in a center portion with respect to a width in rotational axis direction, on the curved surface of each of the recess portions 16*c*. In an opening portion 16*e* (refer to FIG. 9) of the suction port 16*d*, a width in rotational axis direction of the opening portion 16*e* is approximately equal to a width in rotational axis direction of the predetermined area of the outer peripheral surface of the shaft 58 to which the oil repellent solution is applied. Further, the opening portion 16*e* is formed on the recess portion 16*c* at a center area of the width in rotational axis direction of the rectangular protruding portion 16*b*. As shown in FIG. 9, the suction port 16*d* has a depth from the opening 16*e* to the lower side (that is down ward side, the direction toward a suction tube 16*f* as shown in FIG. 9), and a down ward side of the suction port 16*d* is inclined in an approximately funnel shape from the opening 16*e* to a bottom portion in down ward, that is a center portion. Further, an upper end of the suction tube 16*f* extending to a lower side is open to the center portion. The suction tube 16*f* is communicated with an exhaust apparatus such as an exhaust pump (not shown) or the like.

The oil repellent solution coated on the shaft 58, and the excess oil repellent solution is sucked by the suction port 16*d* mentioned above, and the excess oil repellent solution is recovered along the suction tube 16*f*. However, the oil repellent solution having the volatile is solidified on the suction port 16*d* for a short time, and closes the suction tube 16*f* if it is left untouched. In order to dissolve the solidified oil repellent solution and smoothly recover the oil repellent solution, a solvent supplying pipe 18 is connected to an inner side of the suction port 16*d* (FIGS. 3 to 9). Further, an opening portion 18*a* of the solvent supply tube 18 is open to a position for supplying the solvent to the suction port 16*d*. The solvent is supplied to the opening portion 18*a* in the solvent supplying pipe 18 from a solvent supplying apparatus (not shown) through the solvent supplying pipe 18. Any solvent may be employed as far as the solvent dissolves the oil repellent, however, the same solvent as the solvent used in the oil repellent solution is preferable.

In this case, it is preferable to supply the solvent from an upstream side (a left side in FIG. 9) in the rotational direction of the shaft 58 in the suction port 16*d*. In other words, it is preferable to arrange the opening portion 18*a* of the solvent supply tube 18 at an upstream side in the rotational direction of the shaft 58 in the suction port 16*d*. This is because the oil repellent solution coated in the upper portion of the predetermined area of the shaft 58 to which the oil repellent solution is applied flows more at the upstream side than at the downstream side during rotation. Accordingly, it is possible to securely prevent the solid-state oil repellent from being generated from the suctioned oil repellent solution, by supplying the solvent to the upstream side in the rotational direction of the shaft 58. Further, the solvent supply tube 18 is not limited to this, and may be provided, for example, at both the upstream side and the downstream side.

Next, a description will be given of a first embodiment for applying the oil repellent solution with reference to FIGS. 3 to 8.

First, as shown in FIG. 3, the shaft 58 is horizontally held by the part holding device 12, and the part holding device 12 is rotated in the counterclockwise direction in FIG. 3 (a displacing step). The pedestal 16*a* is positioned in the lower side of the shaft 58, and the oil repellent solution supplying nozzle 14 is positioned in the upper side of the shaft 58.

Figure 4:
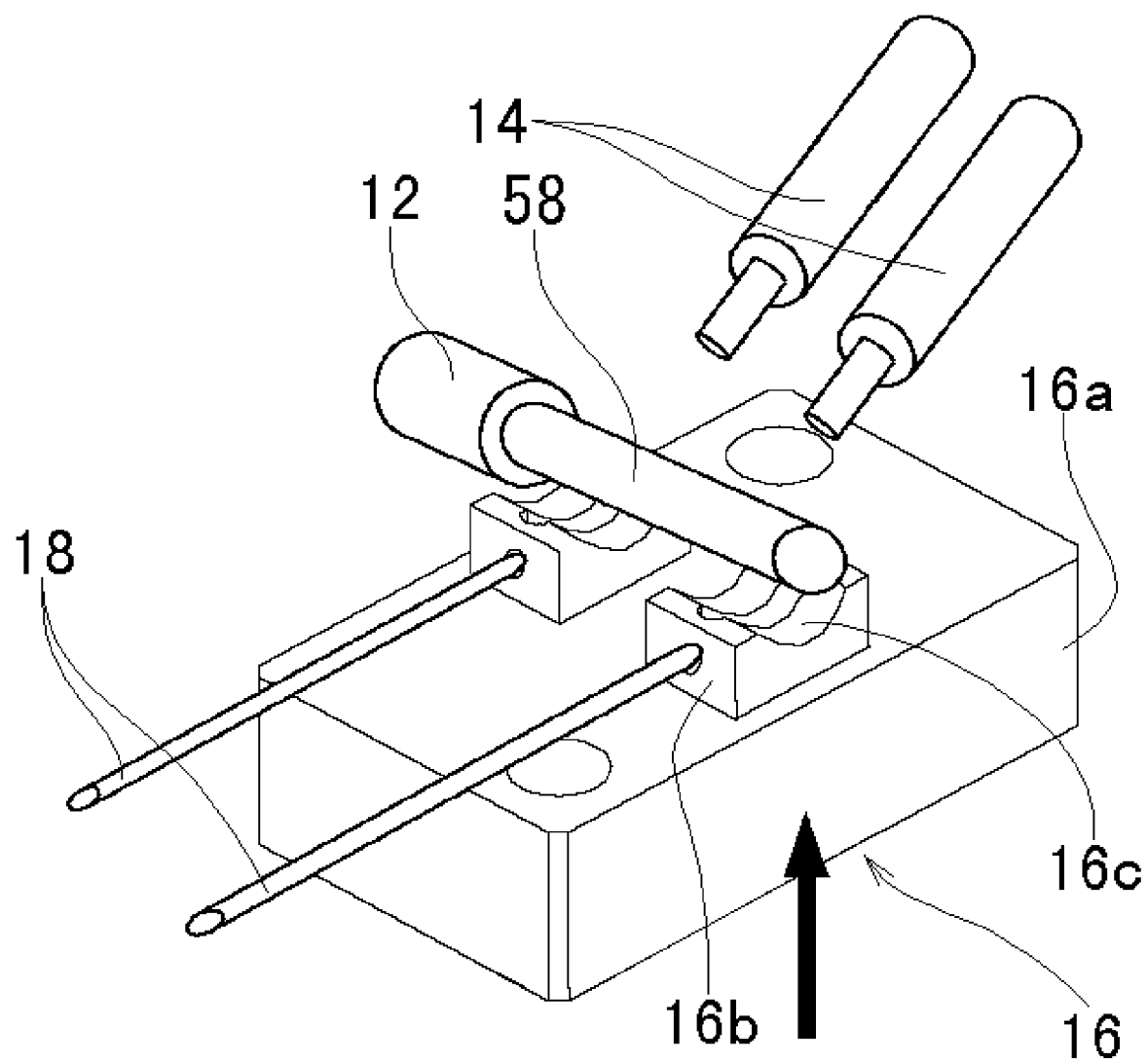
FIG. 4 is a perspective view showing the coating step of the oil repellent solution in accordance with the first embodiment of the present invention.

Next, as shown in FIG. 4, the pedestal 16*a* is moved upward, and the recess portion 16*c* in each of the protruding portions 16*d* of the pedestal 16*a* is arranged in parallel just below the center axis of the shaft 58 held by the part holding device 12. At this time, a predetermined radial gap (for example, 0.5 to 4 mm, preferably 1 to 2 mm) is formed between the recess portion 16*c* and the outer peripheral surface of the shaft 58. Further, the opening portion 16*e* of the recess portion 16*c* is opposed to a part of the predetermined area on the outer peripheral surface of the shaft 58, onto which the oil repellent solution should be applied, in the radial direction. In this case, it is preferable that the radial gap between the recess portion 16*c* and the outer peripheral surface of the shaft 58 is approximately constant in the axial direction except at the opening portion 16*e*. Further, the suction apparatus 16 is operated at the same time of moving upward the pedestal 16*a*, and the suction is started.

Figure 5:
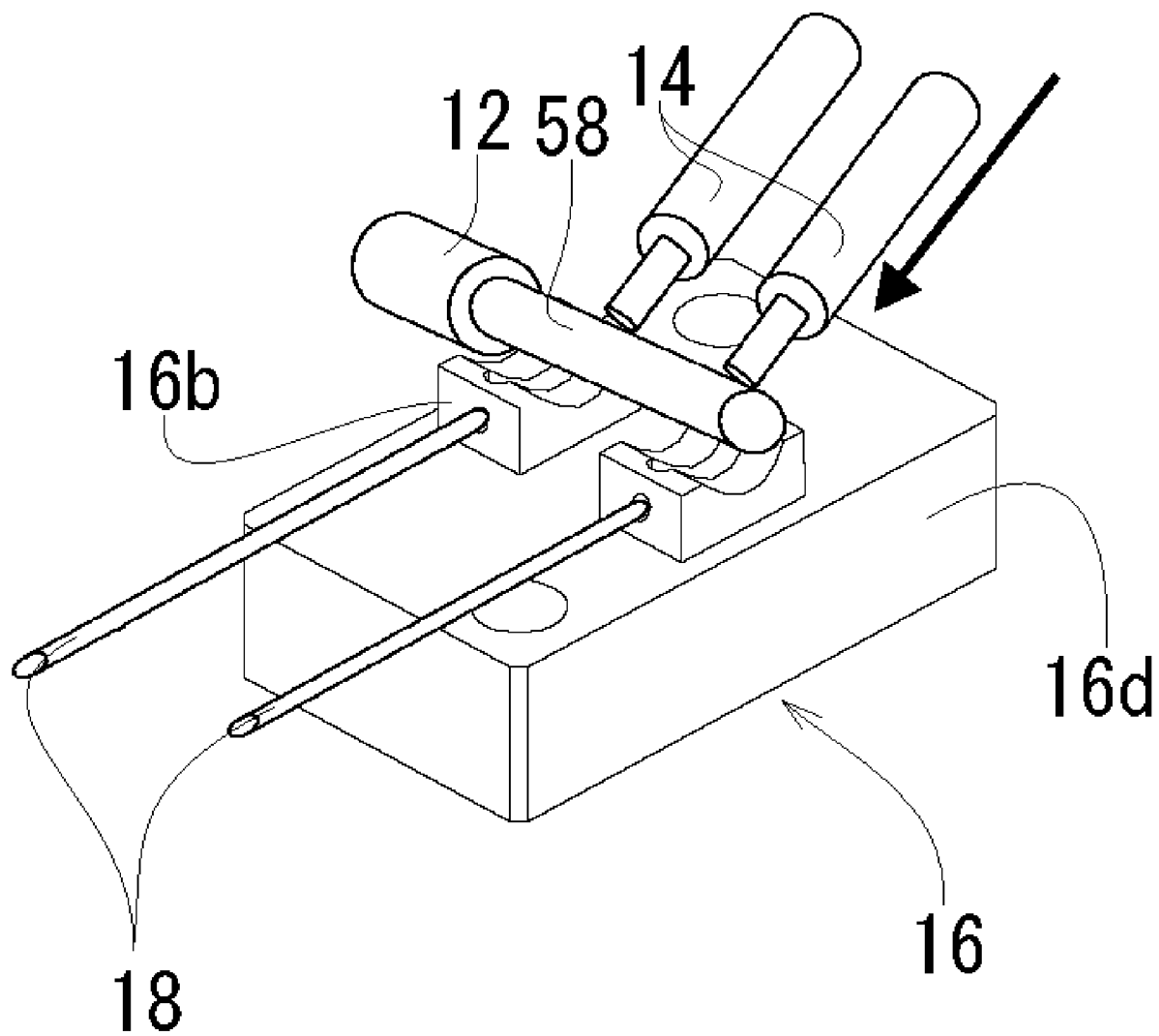
FIG. 5 is a perspective view showing the coating step of the oil repellent solution in accordance with the first embodiment of the present invention.

Further, as shown in FIG. 5, a pair of oil repellent solution supplying nozzles 14 are moved downward, and the leading end portions of the oil repellent solution supplying nozzles 14 are arranged just above predetermined areas of the outer peripheral surface of the shaft 58, respectively, with a slight gap therebetween. The opening portion 16e of the suction port 16d is positioned just below the leading end portions of the oil repellent solution supplying nozzles 14 and the part of the predetermined area of the outer peripheral surface of the shaft 58.

Figure 6:
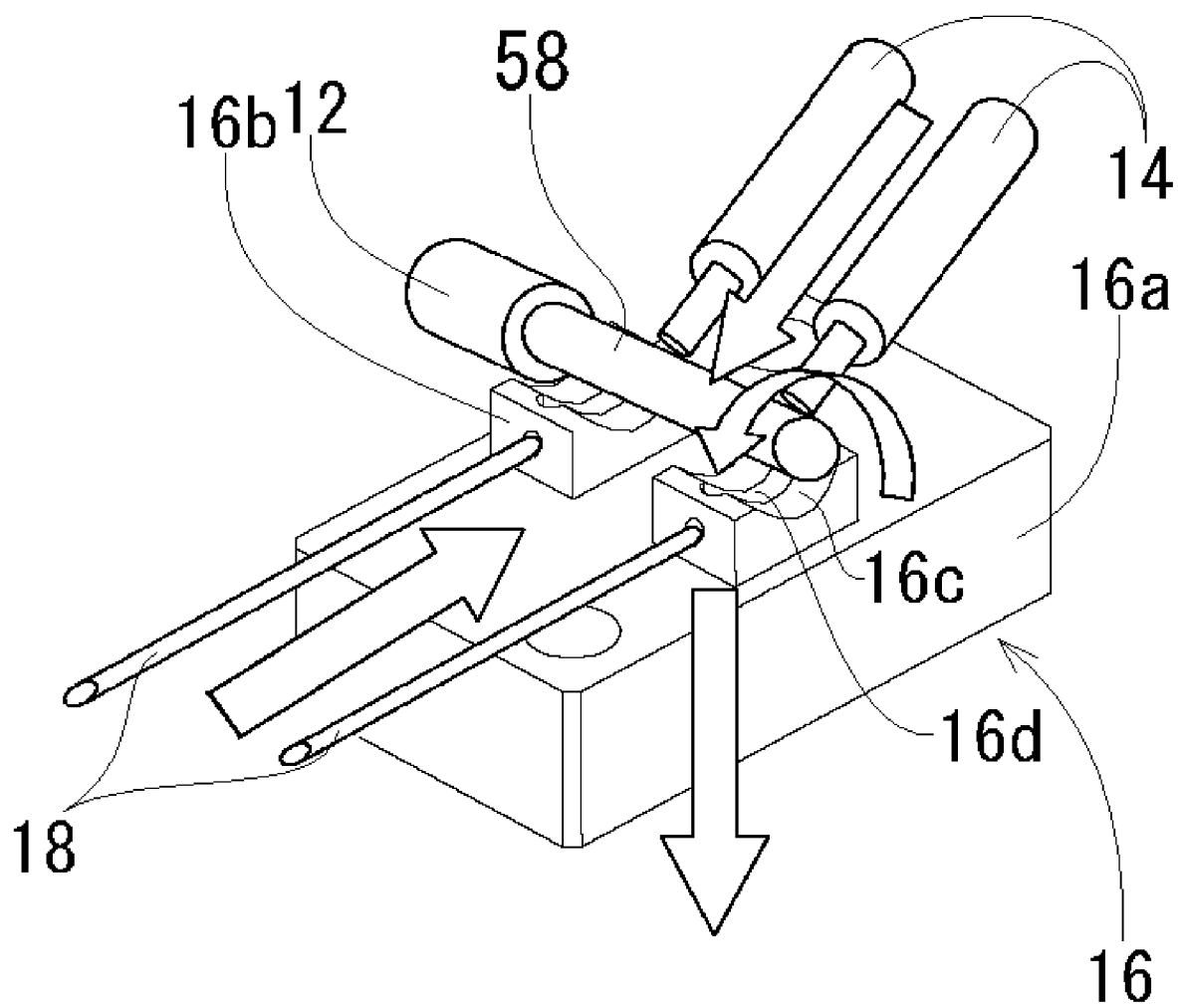
FIG. 6 is a perspective view showing the coating step of the oil repellent solution in accordance with the first embodiment of the present invention.
Figure 7:
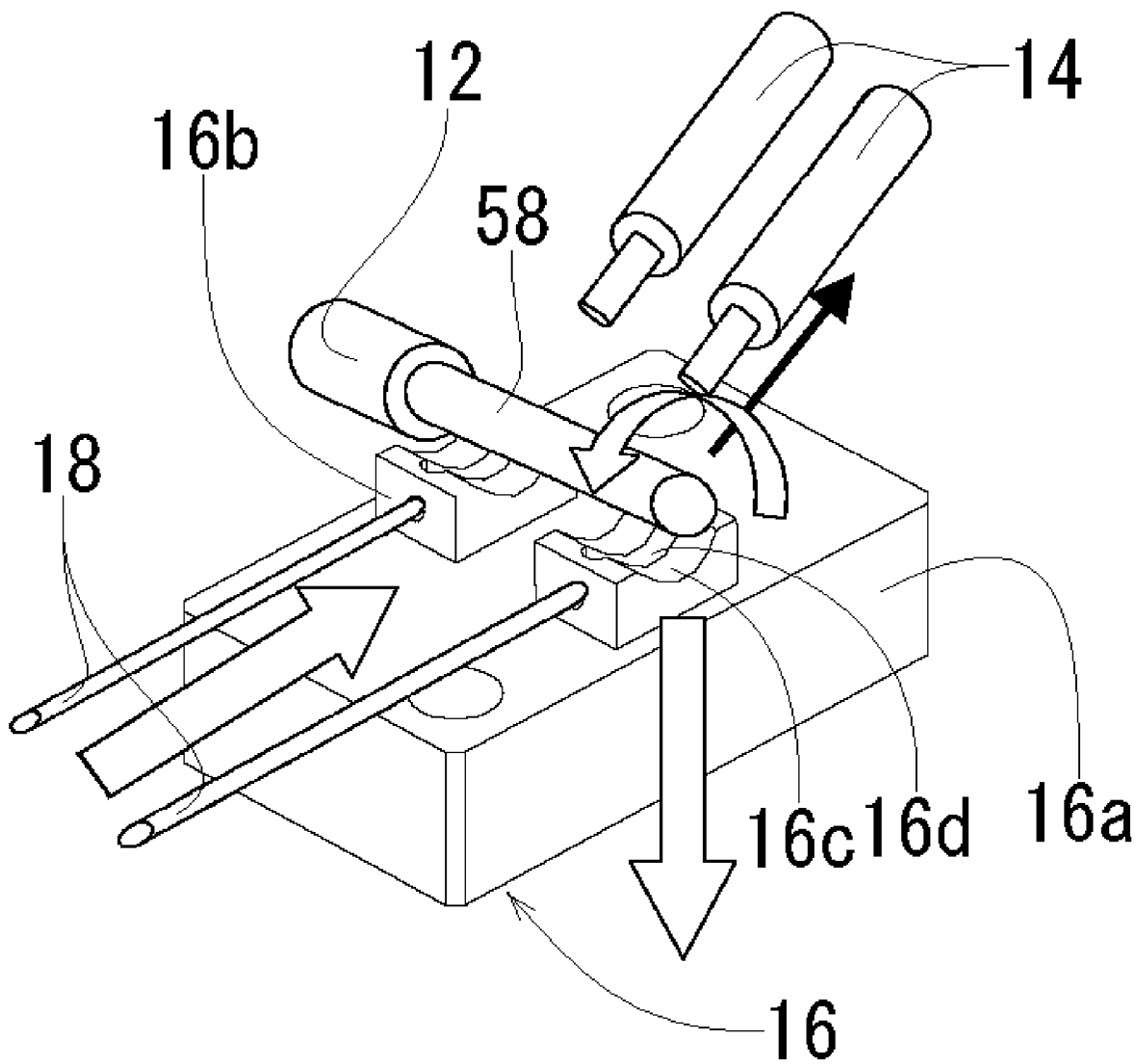
FIG. 7 is a perspective view showing the coating step of the oil repellent solution in accordance with the first embodiment of the present invention.
Figure 8:
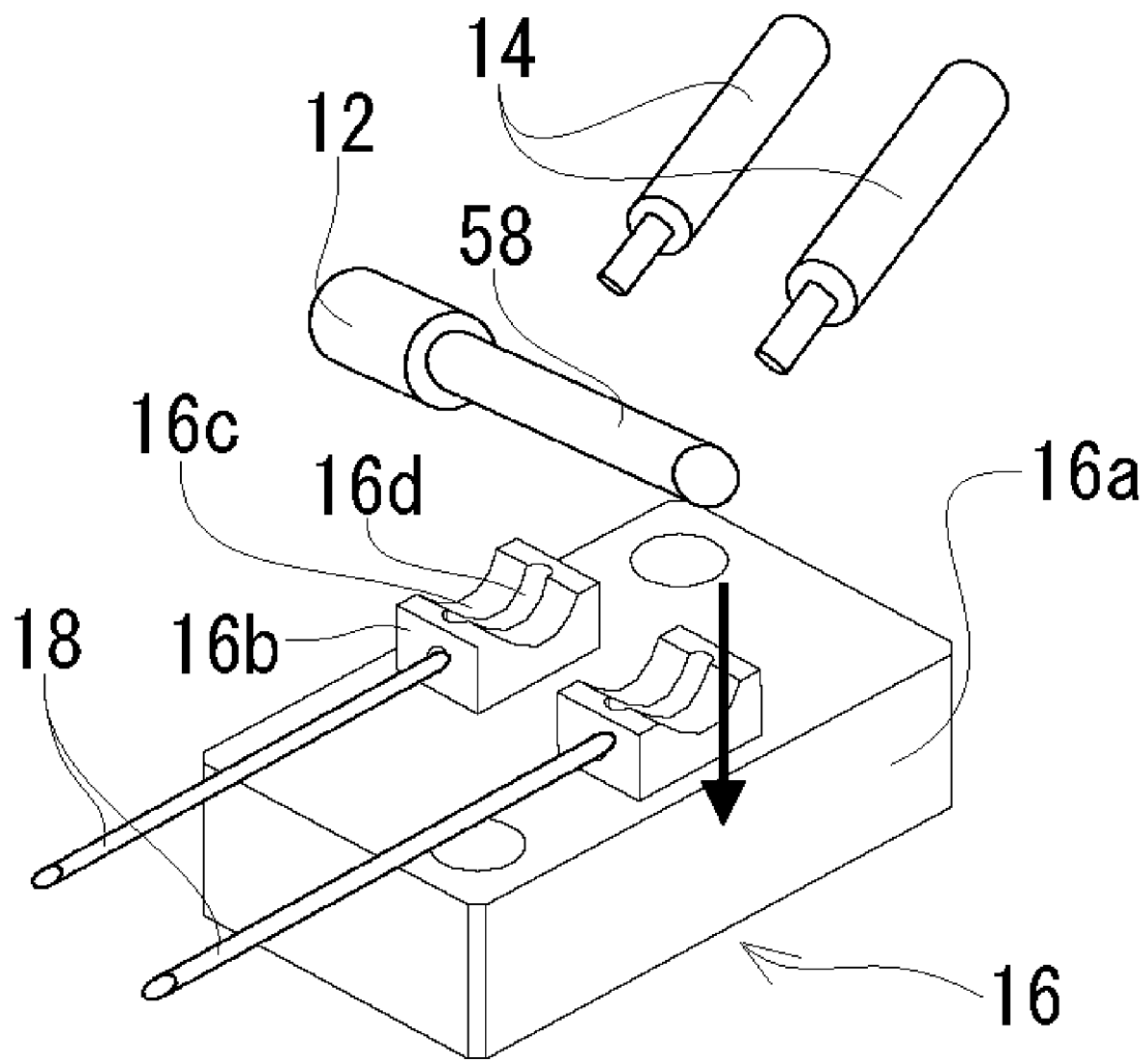
FIG. 8 is a perspective view showing the coating step of the oil repellent solution in accordance with the first embodiment of the present invention.

Subsequently, as shown in FIG. 6, the application of the oil repellent solution supplied through the oil repellent solution nozzles 14 is started with respect to the parts of the predetermined two areas apart from each other in the axial direction on the outer peripheral surface of the rotating shaft 58 (a supplying step). Since the oil repellent solution is applied to the part of the predetermined area while rotating the shaft 58, it is possible to apply the oil repellent solution all around the periphery of each of the predetermined areas on the outer peripheral surface of the shaft 58. At the same time (or prior to this), the solvent supply into the suction port 16d from the opening portion 18a of the solvent supply tube 18 is started (a solvent supplying step).

At this time, as mentioned above, the predetermined radial gap is formed between the recess portion 16c and the outer peripheral surface of the shaft 58. Accordingly, the suction force generated by the intake air current flowing from both sides in the axial direction of the shaft 58 through the portion between the recess portion 16c and the outer peripheral surface of the shaft 58 and exhausted from the opening portion 16e of the suction port 16d is applied to the oil repellent solution applied to the part of the predetermined area on the outer peripheral surface of the shaft 58 and flowing downstream, by operating the suction apparatus 16. Accordingly, it is possible to control the spread of the oil repellent solution in the predetermined area on the outer peripheral surface of the shaft 58, and the applied excess oil repellent solution is sucked and removed (a peeling step).

Further, since an evaporation of the solvent in the applied oil repellent solution is promoted by the sucked air current, it is possible to precisely control the area in which the oil repellent solution circulates around on the outer peripheral surface of the shaft 58 and the oil repellent film is formed, in the axial direction. Further, it is possible to more improve a uniformity of the thickness of the oil repellent solution applied to the predetermined area on the outer peripheral surface of the shaft 58.

Further, the oil repellent solution supplying nozzles 14 are not in contact with the outer peripheral surface of the shaft 58. Accordingly, it is possible to prevent the dusts or the like from being generated, due to the contact of the oil repellent solution supplying nozzles 14 with the outer peripheral surface of the shaft 58. Further, the suction apparatus 16 is not in contact with any of the oil repellent solution applied to the predetermined area on the outer peripheral surface of the shaft 58 and the predetermined area. Accordingly, it is possible to prevent the film thickness of the oil repellent film formed after the application from being uneven, due to the contact of the suction apparatus 16 with the oil repellent solution applied to the predetermined area on the outer peripheral surface of the shaft 58, and it is possible to prevent the dusts or the like from mixing in the oil repellent film, due to the contact.

Further, since the evaporation of the solvent is promoted in the oil repellent solution applied to the predetermined area on the outer peripheral surface of the shaft 58, due to the suction air current, the solid-state oil repellent tends to be generated together with the evaporation of the solvent. In the case that the volatile solvent is employed as the solvent for the oil repellent solution, the solid-state oil repellent tends to be generated particularly. However, in the present embodiment, the solvent is further added to the oil repellent solution by sucking the solvent by means of the suction apparatus 16 while supplying the solvent dissolving the oil repellent into the suction port 16d (a recovering step). Accordingly, it is possible to prevent the solid-state oil repellent from being generated from the sucked oil repellent solution. Therefore, it is possible to prevent the suction force of the suction apparatus 16 from being lowered, and it is possible to prevent a suction inability, due to the generation of the solid-state oil repellent.

Finally, as shown in FIG. 5, when the application of the oil repellent solution to the predetermined area on the outer peripheral surface of the shaft 58 is finished, the oil repellent solution supplying nozzles 14 are moved upward, and is moved apart from the shaft 58. At this time, the solvent supplying apparatus continuously supplies the solvent into the suction port 16d from the opening portion 18a, and the suction apparatus 16 continuously sucks.

As shown in FIG. 6, after the suction by the suction apparatus 16 is sufficiently executed, the suction is stopped, and the solvent supply from the solvent supplying apparatus is stopped as well as the pedestal 16a is moved downward. Further, the rotation of the shaft 58 is stopped.

Finally, as shown in FIG. 5, when the application of the oil repellent solution to the predetermined area on the outer peripheral surface of the shaft 58 is finished, the oil repellent solution supplying nozzles 14 are moved upward, and are moved apart from the shaft 58. At this time, the solvent supplying apparatus continuously supplies the solvent into the suction port 1 6d from the opening portion 18a, and the suction apparatus 16 continuously generates suction.

Figure 10:
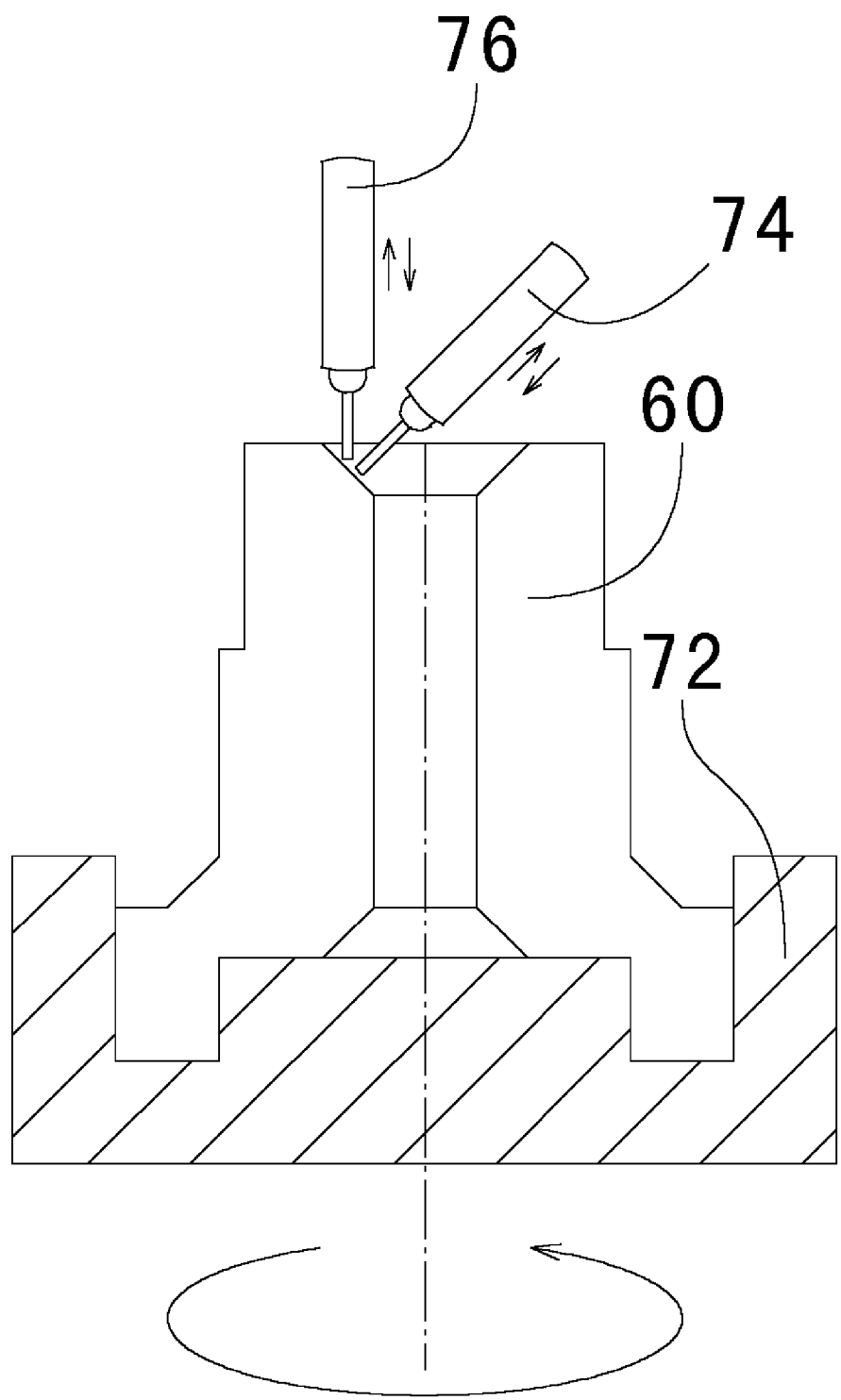
FIG. 10 is a cross-sectional view showing a coating step of the oil repellent solution in accordance with a second embodiment of the present invention.
Figure 11:
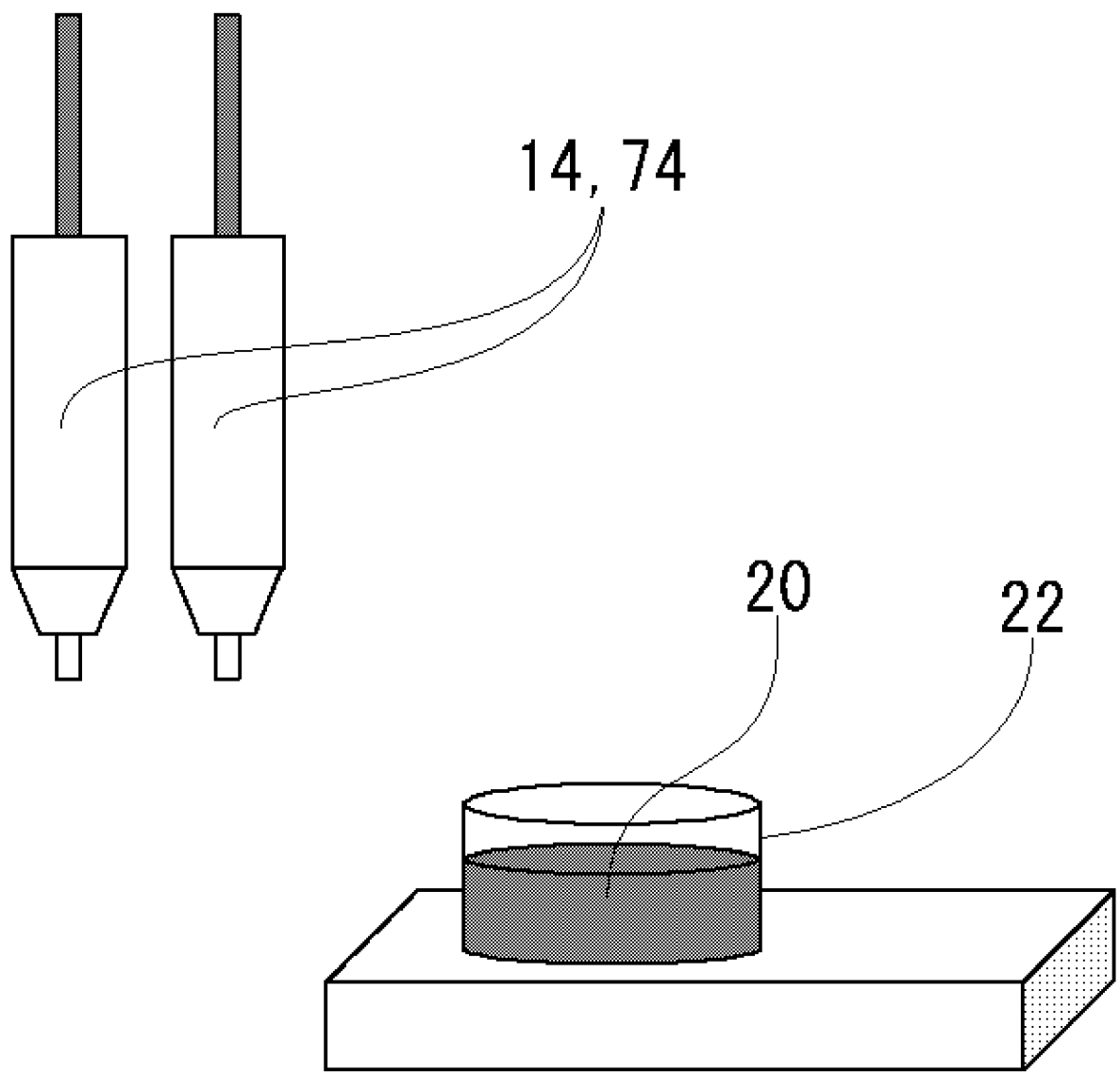
FIG. 11 is a schematic view showing a cleaning step of a supply nozzle.

As shown in FIG. 10, the sleeve 60 is held by a rotating part holding device 72. An oil repellent solution supplying nozzle 74 applies the oil repellent solution to the sleeve 60 by an oil repellent solution supply apparatus (not shown) at a time of operating. An oil repellent solution suction nozzle 76 sucks the oil repellent solution applied by a suction apparatus (not shown) at a time of operating.

First, the sleeve 60 is horizontally held by the holding device 72. Next, leading end portions of the oil repellent solution supplying nozzle 74 and the oil repellent solution suction nozzle 76 are arranged at positions slightly apart from each other just above a predetermined area on an inner peripheral surface of the sleeve 60.

Subsequently, the oil repellent solution suction nozzle 76 is operated and the suction is started. At the same time of operating the oil repellent solution suction nozzle 76, or after the operation, the oil repellent solution supplying nozzle 74 is operated, and the oil repellent solution is applied to the part of the predetermined area of the sleeve 60. Further, when the oil repellent solution supplying nozzle 74 finishes applying the oil repellent solution to the predetermined area of the sleeve 60, the oil repellent solution supplying nozzle74 is moved upward, and is moved apart from the sleeve 74. At this time, the oil repellent solution suction nozzle 76 continuously generates suction.

Finally, after the suction is sufficiently executed by the oil repellent solution sucking nozzle 76, the suction is stopped, and the oil repellent solution suction nozzle 76 is moved upward and is moved apart from the sleeve 60. Further, the rotation of the part holding device 72 is stopped.

In accordance with the present embodiment, the same operation and effect as those of the first embodiment can be obtained by using the method of applying the oil repellent solution and the method of forming the oil repellent film.

Next, a description will be given of an embodiment for cleaning the oil repellent solution supplying nozzles 14 and 74, with reference to FIGS. 11 to 14.

There is a case that the oil repellent solution supplying nozzles 14 and 74 can not discharge the oil repellent solution due to the solidification of the oil repellent, or a case that the discharge amount is small.

In the case mentioned above, first, as shown in FIG. 11, it is checked in the other places before applying the oil repellent solution to the shaft 58 and the sleeve 60 whether or not the oil repellent solution is discharged from the leading end portions of the oil repellent solution supplying nozzles 14 and 74 (a checking step).

Figure 12:
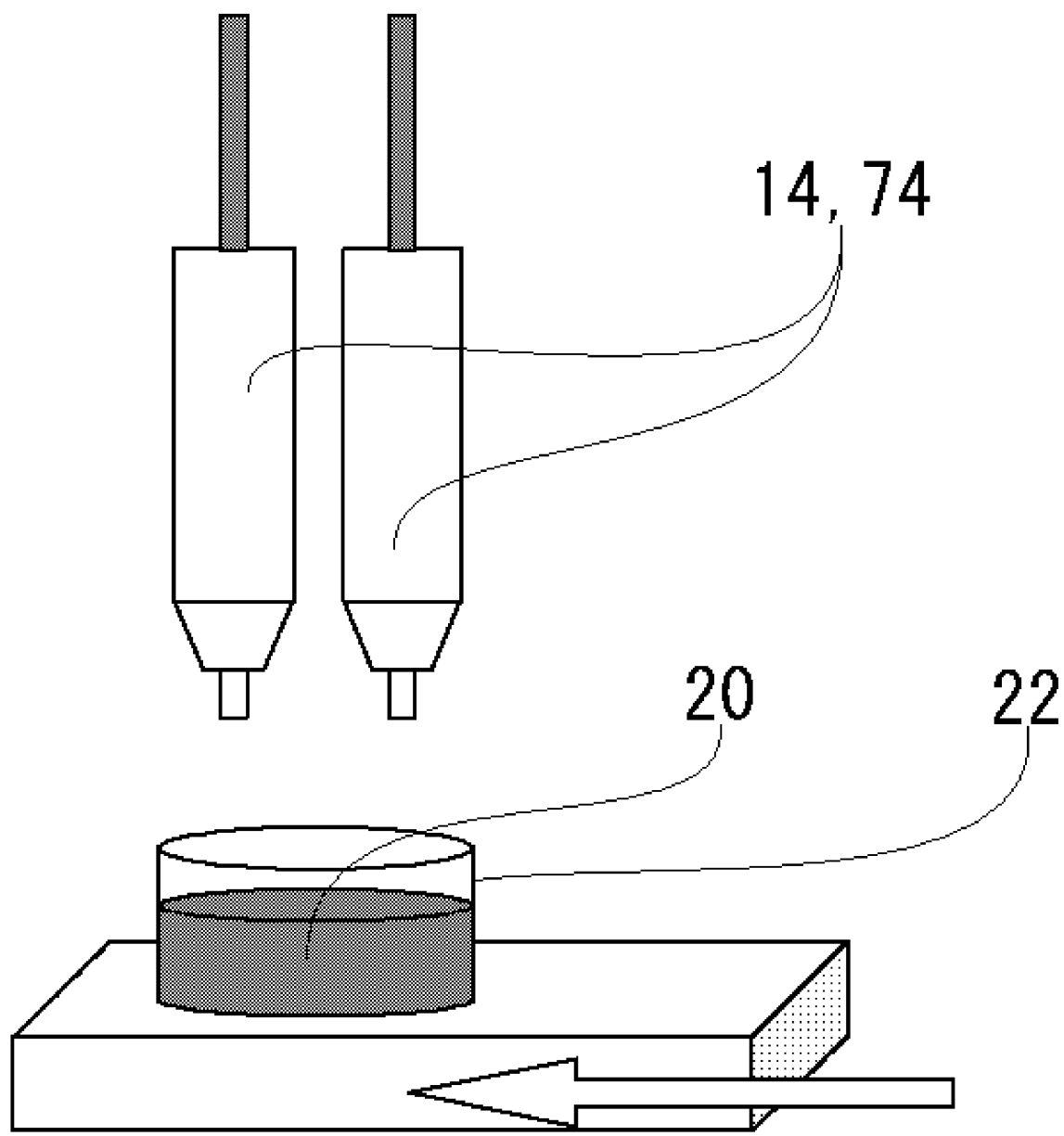
FIG. 12 is a schematic view showing the cleaning step of the supply nozzle.
Figure 13:
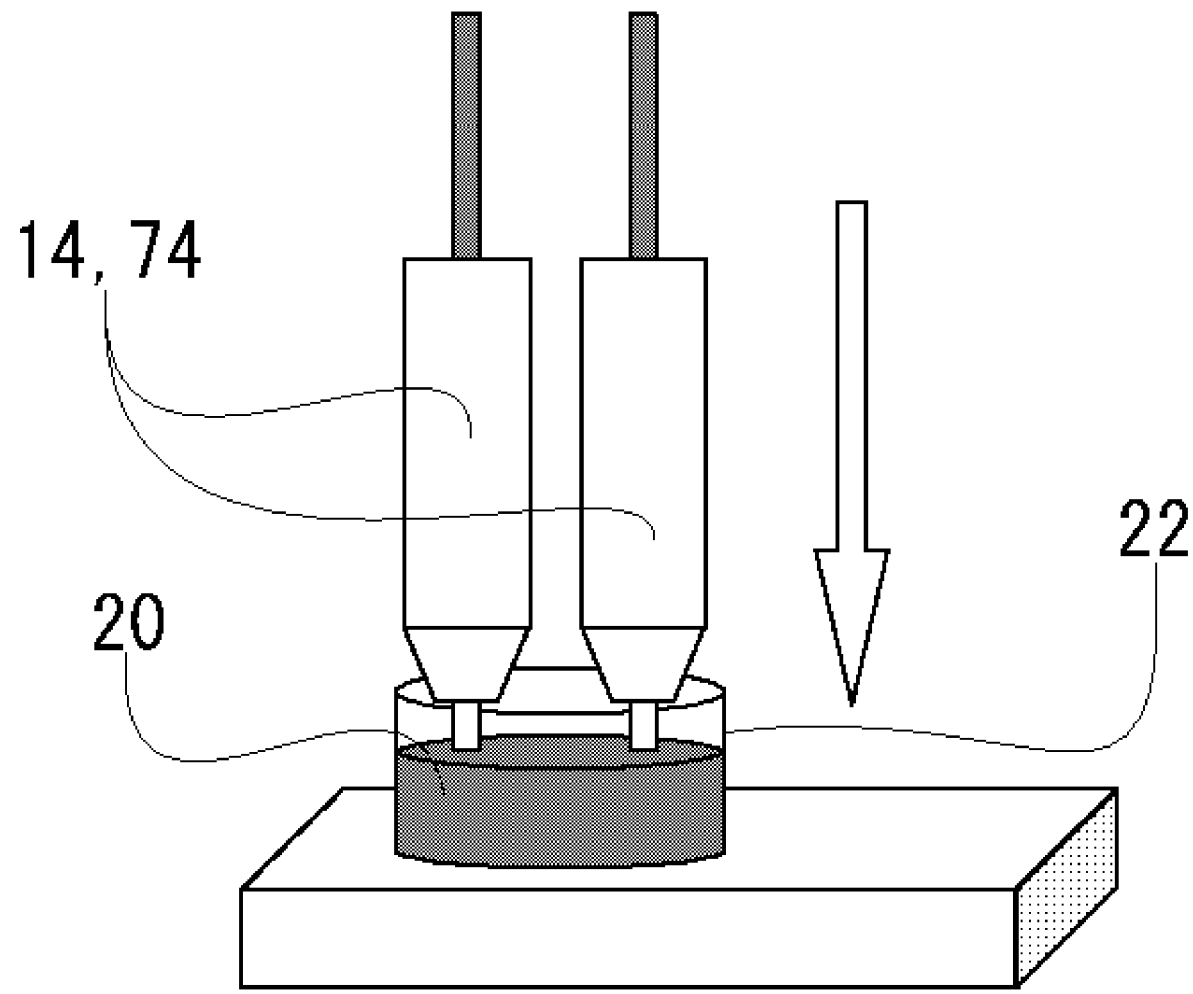
FIG. 13 is a schematic view showing the cleaning step of the supply nozzle.

As shown in FIG. 12, a solvent container 22 reserving a solvent 20 dissolving the oil repellent is positioned in a lower side of the leading end portions of the oil repellent solution supplying nozzles 14 and 74. Further, as shown in FIG. 13, the oil repellent solution supplying nozzles 14 and 74 are moved downward, and the discharging operation is executed in a state in which the leading end portions are positioned within the solvent 20 (a step of dipping the leading end portions of the oil repellent solution supplying nozzles).

Figure 14:
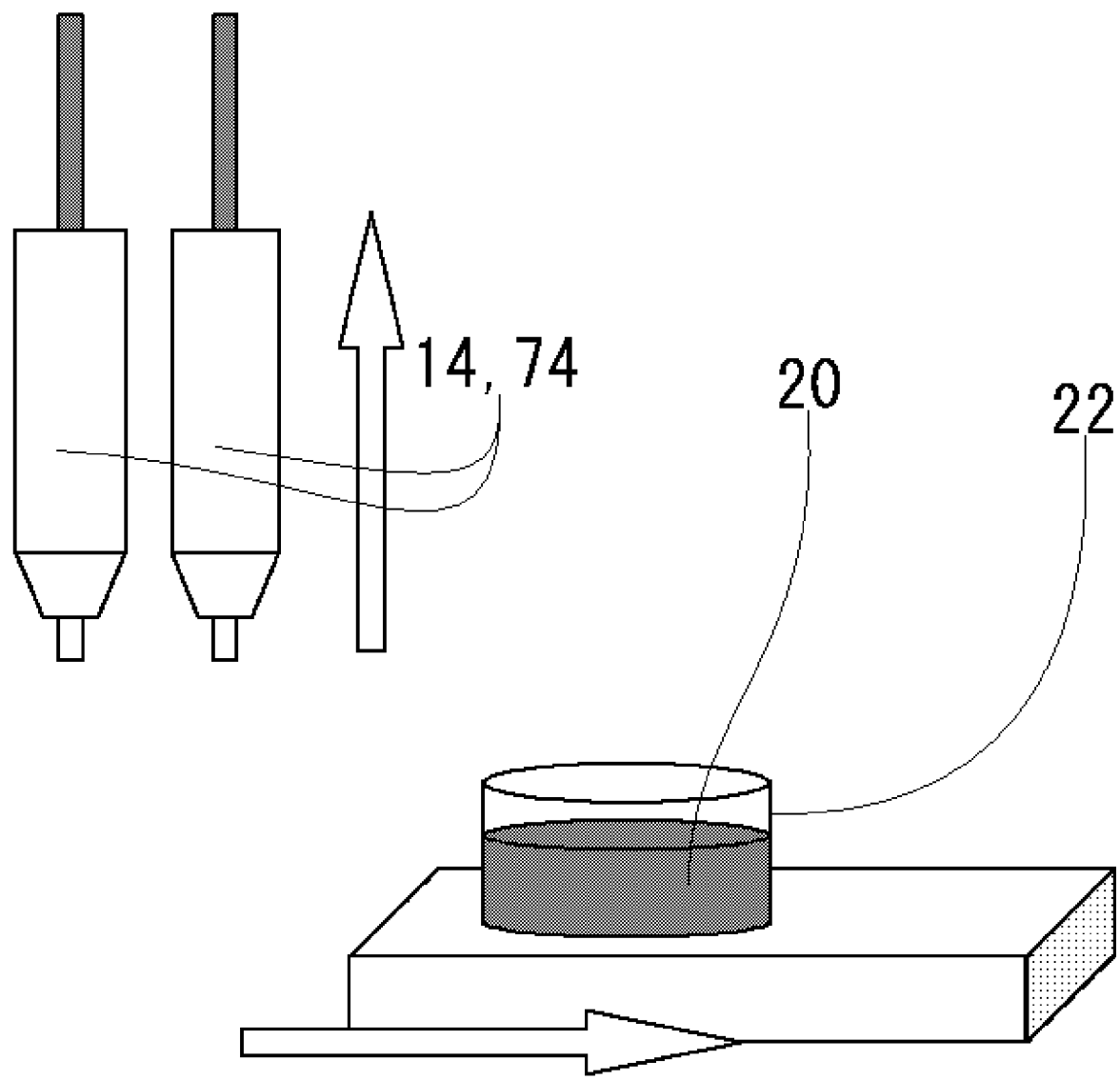
FIG. 14 is a schematic view showing the cleaning step of the supply nozzle.

Next, as shown in FIG. 14, the oil repellent solution supplying nozzles 14 and 74 are moved upward so as to be pulled up from the solvent 20, the solvent container 22 is returned to the original position, and thereafter, the discharge test is again executed.

If a good discharge by the oil repellent solution supplying nozzles 14 and 74 is confirmed, the step goes to the oil repellent solution applying work. Unless it is confirmed, the steps in FIGS. 12 to 14 are repeated(a clogging canceling step).

Since it is possible to apply the oil repellent solution to the predetermined area of the shaft 58 and the sleeve 60 at a high reliability on the basis of the steps mentioned above, the quality of the oil repellent film in accordance with a mass production is stable.

The description is given above of each of the embodiments of the spindle motor manufacturing method in accordance with the present invention, however, the present invention is not limited to each of the embodiments mentioned above, and can be variously modified and changed within the scope of the invention.

For example, the spindle motor in accordance with the present invention is of the shaft fixed type, however, the present invention can be applied to a shaft rotation type spindle motor.

Further, the oil repellent film can be formed on the outer peripheral surface of the shaft of the spindle motor in accordance with the present invention, by employing the apparatus in accordance with the second embodiment.

Further, the step of peeling a part of the oil repellent solution is not limited to the method of sucking the oil repellent solution supplied to the predetermined area. For example, a method of blowing away the oil repellent solution may be employed.

What is claimed is:

1. A method of forming an oil-repellent film on a predetermined area of one of a stationary bearing component and a rotary bearing component which together constitute a bearing, comprising the steps of:

supplying a solution of oil repellent through a supply member of an oil repellent supply apparatus and onto said bearing component within the predetermined area thereof, and moving the predetermined area of said bearing component and the supply member of the oil repellent supply apparatus relative to one another while the solution of oil repellant is being supplied onto said bearing component to thereby coat the predetermined area with the oil repellent; and suctioning the predetermined area of said bearing component to remove excess oil repellent from the predetermined area of the bearing component.

2. The method as claimed in claim 1, wherein the predetermined area of said bearing component is juxtaposed with a removal member of an oil repellent removal apparatus, and wherein the excess oil repellent is suctioned from the predetermined area of said bearing component into the removal member of the oil repellant removal apparatus while the solution of oil repellant is being supplied onto said bearing component by said supply apparatus.

3. The method as claimed in claim 1, wherein the excess oil repellent is suctioned from the predetermined area into an oil repellent removal apparatus before the solution of oil repellent solution solidifies in the predetermined area.

4. The method as claimed in claim 1, wherein the excess oil repellent is suctioned from the predetermined area into an oil repellent removal apparatus before the solution of oil repellent diffuses out of the predetermined area.

5. The method as claimed in claim 1, wherein the excess oil repellent is suctioned from the predetermined area into an oil repellent removal apparatus at the same time the solution of oil repellent is being supplied to the predetermined area by the oil repellent supply apparatus.

6. The method as claimed in claim 1, wherein the supplying of the solution of oil repellent comprises supplying the solution of oil repellent though a nozzle directed towards and spaced from the predetermined area of said component.

7. The method as claimed in claim 6, further comprising checking whether the nozzle is clogged before the solution of oil repellent is supplied though the nozzle and onto said component.

8. The method as claimed in claim 6, further comprising treating the nozzle to remove solidified oil repellent from the nozzle.

9. The method as claimed in claim 1, wherein the suctioning of the excess oil repellent comprises using an oil repellent removal apparatus to apply a suctioning air current to the predetermined area of said component to suction some of the solution of oil repellent from the predetermined area of said component.

10. The method as claimed in claim 9, wherein the suctioning air current is created in a recess defining an opening confronting the predetermined area of said component, the shape of the opening being complementary to at least a portion of the predetermined area of said component 11. The method as claimed in claim 1, wherein the excess oil repellent is suctioned into a removal member of an oil repellent removal apparatus, and further comprising supplying, to the removal member of the oil repellent removal apparatus, a solvent capable of dissolving the oil repellent to prevent the solution of oil repellent from solidifying on the removal member of the oil repellent removal apparatus.

12. A method of forming an oil-repellent film on a predetermined area of one of a stationary bearing component and a rotary bearing component which together constitute a bearing, comprising the steps of:

juxtaposing the predetermined area of said bearing component with a supply member of an oil repellent supply apparatus and with a removal member of an oil repellent removal apparatus;

rotating the predetermined area of said bearing component while the predetermined area of said bearing component is juxtaposed with the supply member of the oil repellent supply apparatus and the removal member of the oil repellent removal apparatus;

supplying a solution of oil repellent through the supply member of the oil repellent supply apparatus and onto said component within the predetermined area thereof while the predetermined area of said bearing component is rotated and juxtaposed with the supply member and the removal member; and suctioning excess oil repellent from the predetermined area of said component using the removal member of the oil repellent removal apparatus while the predetermined area of said bearing component is rotated and juxtaposed with the supply member and the removal member.

13. The method as claimed in claim 12, wherein the excess oil repellent is suctioned from the predetermined area using the removal member of the oil repellent removal apparatus before the solution of oil repellent solution solidifies in the predetermined area.

14. The method as claimed in claim 12, wherein the excess oil repellent is suctioned from the predetermined area using the removal member of the oil repellent removal apparatus before the solution of oil repellent diffuses out of the predetermined area.

15. The method as claimed in claim 12, wherein the excess oil repellent is suctioned from the predetermined area using the removal member of the oil repellent removal apparatus at the same time the solution of oil repellent is being supplied to the predetermined area with the oil repellent supply apparatus.

16. The method as claimed in claim 15, wherein the supplying of the oil repellent with the supply apparatus comprises directing the solution of oil repellent onto the predetermined area at a location upstream of a location from which the oil repellent is suctioned from the predetermined area of said component by the removal member of the oil repellent removal apparatus, with respect to the direction in which the predetermined area of said component is rotated.

17. The method as claimed in claim 12, wherein the supplying of the solution of oil repellent comprises supplying the solution of oil repellent through a nozzle directed towards and spaced from the predetermined area of said component.

18. The method as claimed in claim 17, further comprising checking whether the supply nozzle is clogged.

19. The method as claimed in claim 17, further comprising treating the nozzle to remove solidified oil repellent from the nozzle.

20. The method as claimed in claim 12, wherein the suctioning of the excess oil repellent comprises using the removal member of the oil repellent removal apparatus to apply a suctioning air current to the predetermined area of said bearing component to suction some of the solution of oil repellent from the predetermined area of said bearing component.

21. The method as claimed in claim 20, wherein the suctioning air current is created in a recess of the removal member defining an opening confronting the predetermined area of said bearing component, the shape of the opening being complementary to at least a portion of the predetermined area of said component.

22. The method as claimed in claim 12, wherein the excess oil repellent is suctioned via the removal member of the oil repellent removal apparatus, and further comprising supplying, to the removal member of the oil repellent removal apparatus, a solvent capable of dissolving the oil repellent to prevent the solution of oil repellent from solidifying on the removal member of the oil repellent removal apparatus.

* * * * *